Figure 1:
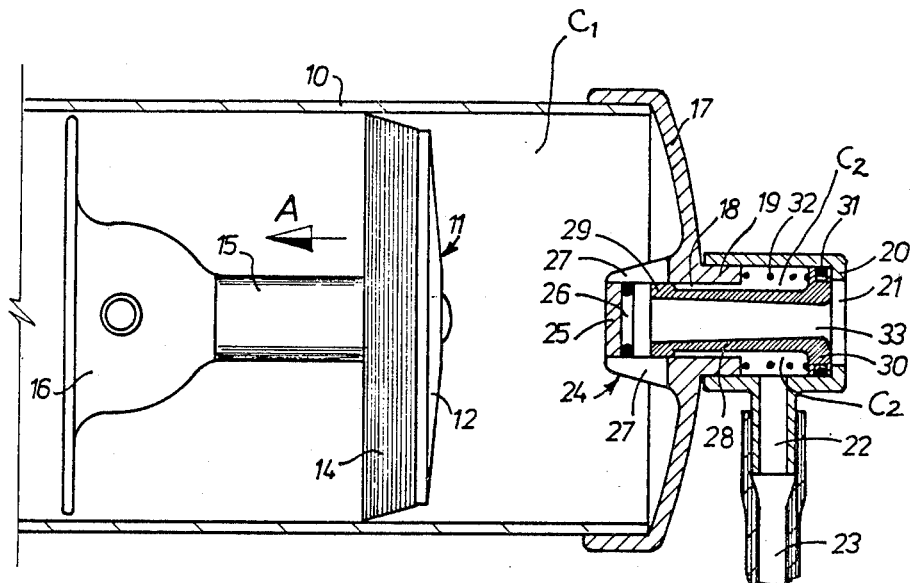

United States Patent [19]

Scott

[11] 4,366,831

[45] Jan. 4, 1983

[54] VACUUM CLOSED VENTING VALVE

[75] Inventor: Michael J. Scott, Feilding, New Zealand

[73] Assignee: Allflex International Limited, Palmerston North, New Zealand

[21] Appl. No.: 209,323

[22] Filed: Nov. 24, 1980

[30] Foreign Application Priority Data

Nov. 22, 1979 [NZ] New Zealand .................. 192198

[51] Int. Cl.³ .................................... A01J 5/10
[52] U.S. Cl. ................................ 137/103; 91/468;
119/14.08; 137/625.68
[58] Field of Search ............... 119/14.08; 128/278,
128/297, 298, 299, 300, 301; 137/103, 625.26,
625.48, 625.49, 625.68

[56] References Cited

U.S. PATENT DOCUMENTS 2,652,847 9/1953 Segebarth ................... 137/103
3,910,466 10/1975 Collar ........................ 137/625.68
4,023,588 5/1977 Olander ..................... 119/14.08

FOREIGN PATENT DOCUMENTS 213429 2/1958 Australia ................. 137/103
1002759 3/1952 France ..................... 137/103
710794 6/1954 United Kingdom ...... 137/103

Primary Examiner—George L. Walton

[57] ABSTRACT

A venting valve comprising a body having first and second ports. A movable valve member having a venting passage is located in the body and is biassed to a first position where the venting passage provides communication between the first and second ports. A chamber is located within said body and a third port opens into the chamber. The construction and arrangement is such that the introduction of sub-atmospheric pressure into the chamber via the third port causes the valve member to move to a second position where the first port is isolated from the second port but is opened to the third port via the chamber.

6 Claims, 2 Drawing Figures

VACUUM CLOSED VENTING VALVE

This invention relates to a valve and more particularly to a valve for venting a cavity or chamber in which sub-atmospheric atmosphere may exist.

In the field of machine milking of animals, teat cup removers have been developed whereby the teat cups can automatically be removed at the completion of the animals' milk let down. These so called automatic teat cup removers commonly employ a single acting pneumatic ram to withdraw the teat cups wherein the ram piston is drawn along the cylinder by application of sub-atmospheric pressure in the cylinder. A tether couples the piston to the teat cup claw so that as the piston is sucked along the cylinder the claw is removed away from the animal which has been milked, and suspended prior to its next use. When the teat cups are to be applied to the next animal the operator moves the claw toward the animal and in so doing draws on the tether which moves the ram piston back along the cylinder.

Usually the air line which connects the cylinder to a vacuum source is of sufficient diameter that when the piston is drawn back along the cylinder by pulling on the tether, the vacuum which is built up in the cylinder by such movement is not sufficient to unduly restrict movement of the piston. However, with such a diameter air line the piston when under the influence of sub-atmospheric pressure, moves quickly along the cylinder so causing the claw to be rapidly drawn away from the animal. This rapid movement can cause some distress to the animal.

If on the other hand the bore of the air line is made smaller, the piston moves along the cylinder at a relatively slow uniform rate such that rapid withdrawal of the claw does not occur. Unfortunately, with such a diameter air line the piston becomes difficult to move along the cylinder by drawing on the tether due to the partial vacuum which is built up in the cylinder.

To retain the benefits of the slow movement of the piston resulting from the small diameter air line some means of automatically venting of the cylinder is needed so that the effects of the small diameter line does not make retraction of the piston difficult. A venting valve is thus required which is simple in construction and automatically permits the cylinder to vent to atmosphere when the piston is drawn along the cylinder by the tether.

Broadly, in one aspect of the invention, there is provided a venting valve comprising a body with a movable valve member having a venting passage, said valve member being biassed to a first position where the venting passage provides communication between first and second ports in said body, a third port opening into a chamber in said body such that the introduction of sub-atmospheric pressure into said chamber causes said valve member to move to a second position where said first port is isolated from said second port but is opened to said third port via said chamber.

In a second broad aspect the invention provides a pneumatic linear actuator comprising a cylinder closed at each end, a piston mounted for sliding movement in said cylinder, a tether attached by one end to said piston and passing through an opening in one end of said cylinder and a venting valve as described in the aforementioned first aspect mounted with said cylinder and in communication with that portion of the inside of said cylinder which is on the opposite side of said piston to the said one end.

In the following more detailed description of a preferred form of the invention the venting valve will be described as being mounted with a pneumatic linear actuator of the type which is commonly used in automatic teat cup removal devices. Whilst the venting valve has particular use with such a linear actuator the use is not solely restricted thereto as it can equally be used in applications where a cavity or chamber needs to be vented to atmosphere.

Figure 2:
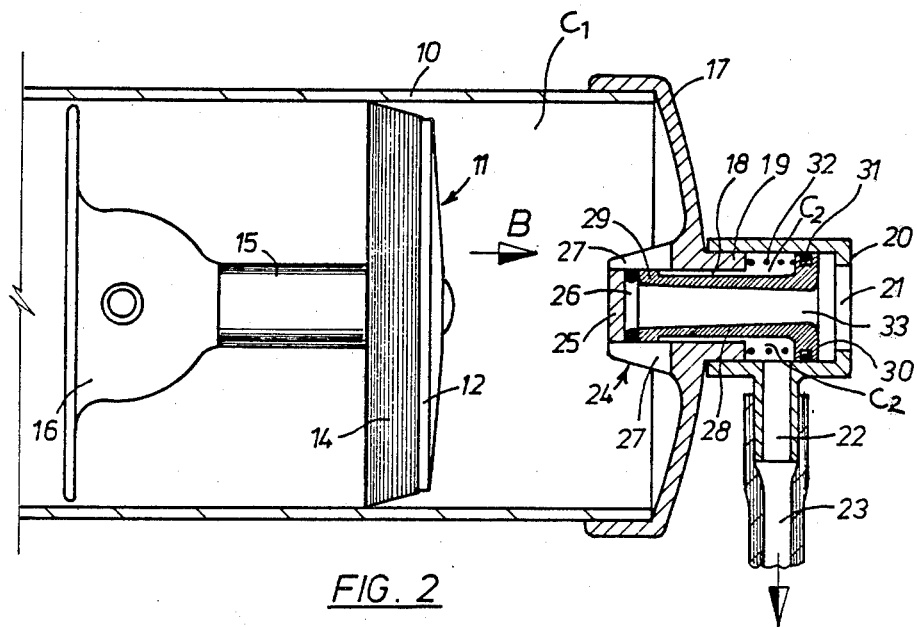

The following description will refer to the accompanying drawings in which:

FIG. 1 is a sectional elevational view of the venting valve of the invention in combination with a pneumatic linear actuator, said valve being in the aforesaid first position; and FIG. 2 is a similar view but with the venting valve in the aforesaid second position.

In the drawings the linear actuator is only partially shown but it consists of a cylinder 10 with a piston 11. The piston is mounted for sliding movement in cylinder 10 and comprises a head 12 with annular seal 14. Head 12 is coupled to a stem 15 which mounts a follower 16. A tether (not shown) passes through an opening in a cover (not shown) at one end of the cylinder 10 and is coupled to piston 11. The other end of the cylinder 10 is closed by an end cover 17 which mounts the venting valve.

In the illustrated form cover 17 has a central opening 18 which is surrounded by an annular wall 19. A cap 20 is fitted over wall 19 and has an end opening 21. A nipple 22 is formed as part of cap 20 and its bore communicates with the interior of cap 20. In use an air line 23 is fitted to nipple 22 and extends to a vacuum source (not shown).

A well 24 is formed on the inside of end cover 17 and has a floor 25 against which is located a sealing ring 26. One or more apertures or slots 27 are provided in the wall of well 24 but do not extend for the full extent of the wall. In the illustrated form four apertures 27 are provided.

The moving element of the venting valve is formed by a tubular member 28 which has a lip 29 formed at one end. This lip 29 locates in well 24 whilst an annular rim 30 at the other end of member 28 locates within cap 20. The tubular member 28 can slide with the housing defined by wall 24, annular wall 19 and cap 20 but normally takes up the position shown in FIG. 1 due to the bias effect of spring 32 which is located between the end of annular wall 19 and underside of rim 30. Sealing between the peripheral edge of rim 30 and inside wall of cap 20 is effected by a sealing ring 31.

To describe the valve in operation, reference is firstly made to FIG. 1. Piston 11 can be readily moved in the direction of arrow A by pulling on the tether due to the fact that the chamber C1 defined between head 12 and end cover 17 is vented to atmosphere through apertures 27, bore 33 of tubular member 28 and end opening 21. Immediately vacuum is applied through air line 23 sub-atmospheric pressure builds up in the cavity C2 defined between lip 29 and rim 30 with the result that tubular member 28 is sucked against the spring bias to take up the position in FIG. 2 where lip 29 sits on seal 26. Accordingly, bore 33 in tubular member 28 is closed and the vacuum builds up in the chamber C1 of cylinder 10 to draw piston 11 along the cylinder in the direction of arrow B. Once the vacuum is switched off tubular member moves back under the influence of bias spring 32 to take up the FIG. 1 position. Accordingly, chamber C1 in cylinder 10 is once more vented to atmosphere which allows piston 11 to be freely moved in the direction of arrow A.

To ensure smooth operation of the valve no undue drag should occur during movement of member 28 nor should the spring 32 be such as to cause undue interference to movement. This freedom of movement is necessary to ensure tubular member 28 moves through the transition stage when lip 29 passes over the inner ends of slots 27 and chamber C1 is thus still open to atmosphere via bore 33.

The venting valve is of a simple but effective construction which allows a cavity or chamber to be vented to atmosphere once a vacuum source is disconnected from the cavity or chamber. With the valve incorporated in a pneumatic linear actuator of the general type described a small diameter vacuum line can be employed to ensure a slow uniform movement of the piston results when the actuator is under vacuum but free movement of the piston in the opposite direction can take place when the vacuum is discontinued.

I claim:

1. A venting valve comprising: a body having a first port which is open to atmosphere and an axially opposed second port which is, in use of the valve, located within a chamber to be evacuated; a valve member located in a cavity within the said body for axial movement therein; a venting passage extending axially through said valve member such that said venting passage connects said first and second ports when said valve member is in a first position within said cavity; spring biassing means located within said cavity to bias said valve member to said first position; first sealing means on said valve member slidingly engaged with the wall of said cavity and located adjacent said first port when said valve member is in said first position; second sealing means on said valve member spaced from said first sealing means; a valve chamber defined by the valve member, the first and second sealing means and the wall of said cavity, said valve chamber being closed from said second port by said second sealing means; and said valve member when said valve member is in a second position; a third port opening into said cavity to communicate with said valve chamber, said third port in use, being connected to a vacuum source such that sub-atmospheric pressure within the valve chamber causes the valve member to move axially against the spring biassing means to said second position whereupon said valve chamber is opened into communication with the second port, the valve further including passage sealing means which close said passage to isolate said first port from said second port when the valve member is in said second position.

2. The valve according to claim 1, wherein said valve member is of generally tubular shape, said first sealing means is a peripheral rim which slidingly engages with the wall surface of said cavity and said second port is formed by one or more apertures in said side wall.

3. The valve according to claim 2, wherein said third port opens into said cavity through the side wall of the body.

4. The valve according to claim 1, wherein said passage sealing means is an O ring set on an end wall of said cavity adjacent said second port, the O ring being of a diameter larger than said venting passage so as to seal the end of said venting passage from the aperture(s).

5. The valve according to claim 1, wherein said second sealing means is formed by a peripheral rim which slidingly engages on said side wall of said cavity, the length of the peripheral rim forming said second sealing means being such that when said valve member is in said first position it seals the aperture(s) from the valve chamber but opens in to said venting passage and when said valve member is in said second position the aperture(s) open said valve chamber.

6. The valve according to claim 1, wherein the body incorporates a closure to be mounted with a chamber to be evacuated.

* * * * *